(12) United States Patent
Olszewski et al.

(10) Patent No.: US 12,020,882 B2
(45) Date of Patent: Jun. 25, 2024

(54) FUSE ASSEMBLY INCLUDING ANTI-ROTATION DEVICE

(71) Applicant: Littelfuse, Inc., Chicago, IL (US)

(72) Inventors: Robert Olszewski, Chicago, IL (US); Jeremy Huang, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 518 days.

(21) Appl. No.: 17/395,757

(22) Filed: Aug. 6, 2021

(65) Prior Publication Data

US 2023/0037990 A1 Feb. 9, 2023

(51) Int. Cl.
*H01H 85/055* (2006.01)
*H01H 85/02* (2006.01)
*H01H 85/165* (2006.01)

(52) U.S. Cl.
CPC ........ *H01H 85/055* (2013.01); *H01H 85/165* (2013.01); *H01H 2085/025* (2013.01)

(58) Field of Classification Search
CPC ............... H01H 85/055; H01H 85/165; H01H 2085/025; H01H 2085/2075–2095
See application file for complete search history.

(56) References Cited

U.S. PATENT DOCUMENTS

| 2001/0011939 A1 | 8/2001 | Inaba | |
| 2009/0108981 A1* | 4/2009 | Iwata | H01R 11/287 337/186 |
| 2010/0019572 A1* | 1/2010 | Kudo | H01H 85/044 307/10.7 |
| 2011/0306243 A1* | 12/2011 | Shiraki | H01R 13/688 439/620.29 |
| 2012/0302098 A1 | 11/2012 | Matsumoto | |
| 2017/0278662 A1* | 9/2017 | Kitano | H01H 85/20 |
| 2018/0205188 A1* | 7/2018 | Urrea | H01H 85/0241 |

FOREIGN PATENT DOCUMENTS

| WO | 2015012221 A1 | 1/2015 |
| WO | 2018106715 A1 | 6/2018 |

OTHER PUBLICATIONS

European Search Report and Written Opinion for the Application No. EP22185057, mailed Mar. 2, 2023, 6 pages.

* cited by examiner

*Primary Examiner* — Jacob R Crum
(74) *Attorney, Agent, or Firm* — KDW FIRM PLLC (57) ABSTRACT

Provided herein is a fuse assembly including an anti-rotation device. In some embodiments, the fuse assembly may include a fusible device connected to a conductive component, wherein the conductive component is operable to connect to a terminal of a power source and a securement device coupled to the fusible device. The securement device may include a body including a recess operable to receive the fusible device and a support post extending from the body, wherein the support post is operable to engage the power source to reduce rotation of the securement device and the fusible device relative to the power source.

17 Claims, 9 Drawing Sheets

FUSE ASSEMBLY INCLUDING ANTI-ROTATION DEVICE

FIELD OF THE DISCLOSURE

The disclosure relates generally to the field of circuit protection devices and, more particularly, to a fuse assembly including an anti-rotation device.

BACKGROUND OF THE DISCLOSURE

Fuses are used as a circuit protection device and can provide an electrical connection between a power source and a circuit to be protected. Fuses can be designed to provide protection to the circuit during an overcurrent and/or an overvoltage condition. In particular, the fuse can be constructed to physically open or interrupt the electrical connection when a specified overcurrent and/or an overvoltage condition occurs, thereby isolating the circuit and preventing damage.

In the automotive market there has been a trend toward implementing so-called "pre-fuse boxes" that are disposed within automobile engine compartments and connected to automobile battery terminals. The primary purpose of a pre-fuse box in an automobile is to prevent electrical damage that may result from short-circuiting in high-current-conducting wires, such as may occur in the event of an accident. In some examples, the fuse may be connected to the battery terminal by a busbar and a central post (e.g., stud or screw) coupled to the fuse element. The central post may be tightened or loosened (e.g., via a nut) to attach and detach the pre-fuse box. However, even after the central post has been secured into place, vibration to the battery may cause the fuse and the busbar to rotate and potentially touch other nearby components, which could cause a short circuit.

Accordingly, there is a need to prevent rotation of the pre-fuse box relative to the power source.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one approach according to the present disclosure, a fuse assembly may include a fusible device connected to a conductive component, wherein the conductive component is operable to connect to a terminal of a power source. The fuse assembly further includes a securement device coupled to the fusible device. The securement device may include a body including a recess operable to receive the fusible device, and a support post extending from the body, wherein the support post is operable to engage the power source to reduce rotation of the securement device and the fusible device relative to the power source.

In another approach of the disclosure, a securement device may include a body including a first end opposite a second end, a first side opposite a second side, and a first main side opposite a second main side, wherein the first main side is operable to receive a fusible device within a recess. The securement device may further include a wall extending from the second main side of the body, wherein the wall includes a first wall end and a second wall end, and wherein the first wall end and the second wall end are offset relative to one another such that a first distance between the first wall end and the first side of the body is different than a second distance between the second wall end and the first side of the body.

In yet another approach of the present disclosure, a fuse assembly may include a fusible device connected to a busbar and base member by a central support, wherein the conductive component is operable to connect to a terminal of a battery, and a securement device coupled to the fusible device. The securement device may include a body including a recess operable to receive the fusible device, and a support post extending from the body, wherein the support post is operable to engage a case of the battery to reduce rotation of the securement device and the fusible device relative to the battery.

BRIEF DESCRIPTION OF THE DRAWINGS

The accompanying drawings illustrate exemplary approaches of the disclosed embodiments so far devised for the practical application of the principles thereof, and in which.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Furthermore, for clarity, some reference numbers may be omitted in certain drawings.

DETAILED DESCRIPTION

Embodiments in accordance with the present disclosure will now be described more fully hereinafter with reference to the accompanying drawings. The assemblies, components thereof, and methods may be embodied in many different forms and should not be construed as being limited to the embodiments set forth herein. Rather, these embodiments are provided so that this disclosure will be thorough and complete, and will fully convey the scope of the assemblies, components, and methods to those skilled in the art.

Figure 1:
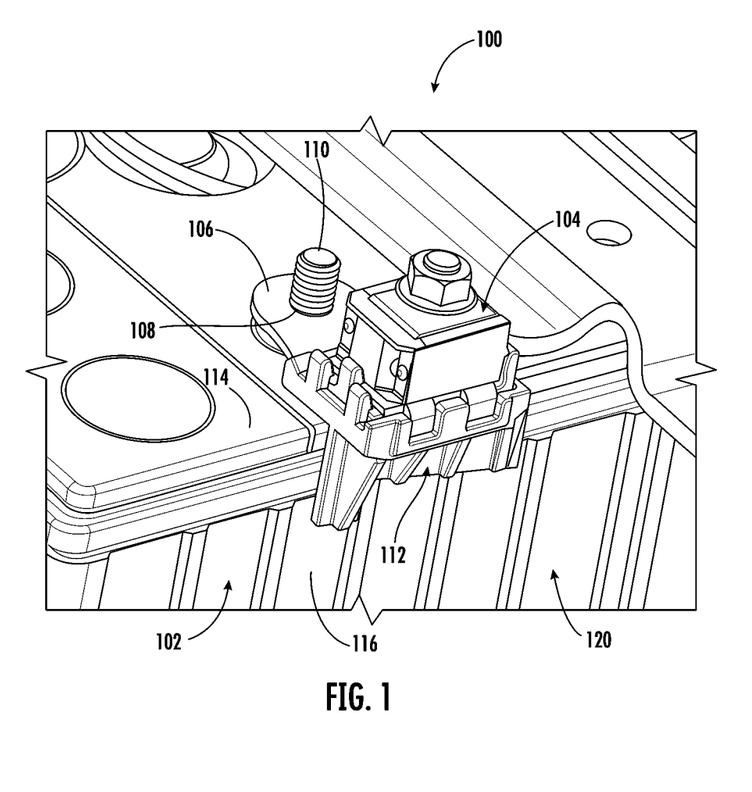
FIG. 1 depicts a perspective view of a fuse assembly and power source according to embodiments of the present disclosure.

FIG. 1 illustrates a fuse assembly (hereinafter "assembly") 100 according to embodiments of the present disclosure. The assembly 100 may be secured to a power source 102, such as a battery, which may be used for vehicles or heavy machinery. In some embodiments, the assembly may include a fusible device (hereinafter "fuse") 104 coupled to the power source 102 by a conductive component, such as a busbar 106. More specifically, an opening 108 of the busbar 106 may receive a terminal 110 of the power supply 102. As will be described in greater detail herein, the fuse 104 may be further coupled to a securement device 112, which may be in contact with an upper surface 114 and a side surface 116 of a case 120 of the power source 102 to prevent rotation of the fuse 104 and the busbar 106. Although not shown, the assembly may include a cover over the fuse 104.

As an example, the fuse 104 can be a high-current Zcase fuse manufactured by Littelfuse, Inc. In general, the fuse 104 provides protection against overvoltage and/or overcurrent conditions. The fuse 102 can include an aperture to accommodate positioning on or around a conductive central support 124. The aperture of the fuse 104 can be a central aperture and can be of any size and shape. The fuse 104 can further include an input terminal and an output terminal. As an example, a top portion of the fuse 104 can provide the input terminal and a bottom portion of the fuse 104 can provide the output terminal.

Figure 2A:
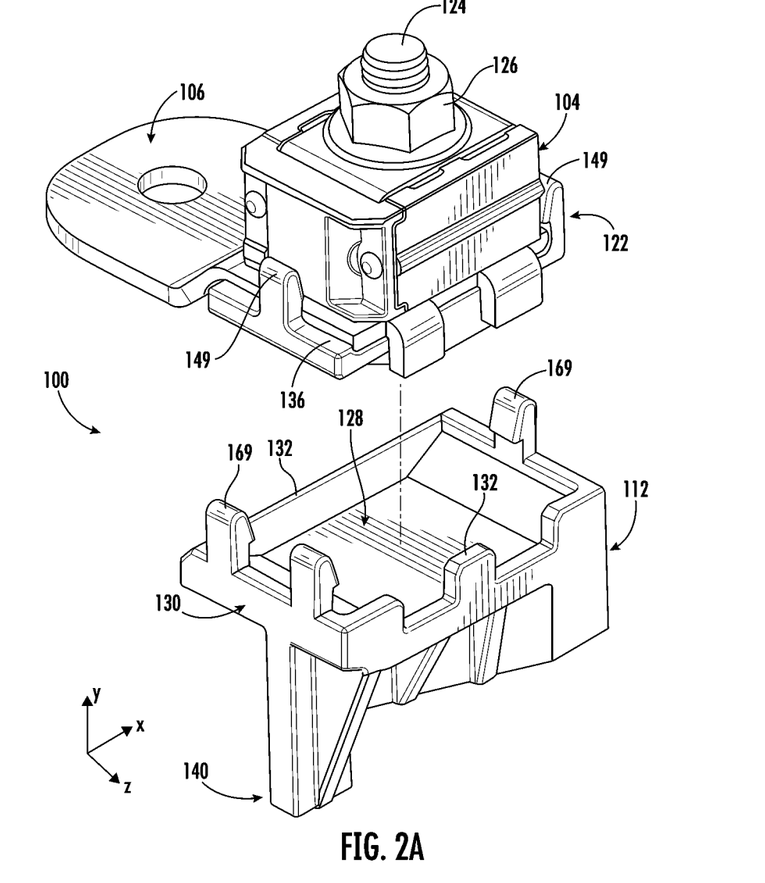
FIG. 2A depicts a partially exploded perspective view of the fuse assembly according to embodiments of the present disclosure.
Figure 2B:
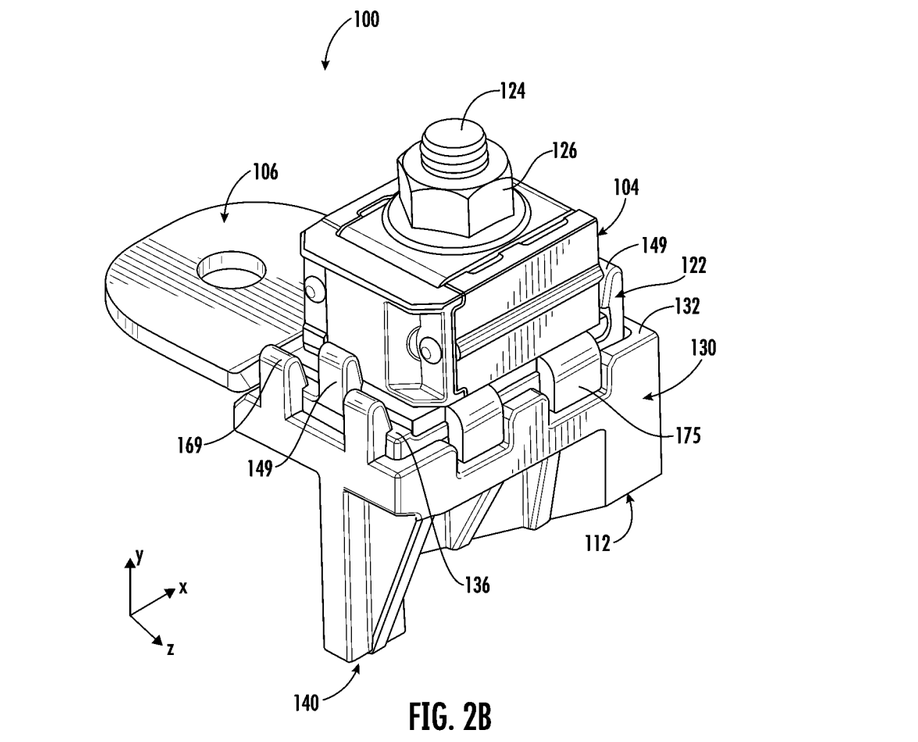
FIG. 2B depicts a perspective view of the fuse assembly according to embodiments of the present disclosure.

FIGS. 2A and 2B demonstrate the assembly 100 in greater detail. As shown, the assembly 100 may further include a base member 122 operable to receive the busbar 106. The fuse 104, the busbar 106, and the base member 122 may be coupled together by the central support (e.g., stud or screw) 124 and a fastener/nut 126. In some embodiments, the central support 124 and the nut 126 may be engaged with one another by complimentary threading.

The fuse 104, the busbar 106, and the base member 122 may be received within a recess 128 of a body 130 of the securement device 112. The recess 128 may be defined, in part, by one or more sidewalls 132 extending along a perimeter of the body 130. In some embodiments, the body 130 may include a plurality of fasteners 169, such as press-fit or snap-fit tabs, extending above the recess 128. The fasteners 169 may be operable to engage an upper wall or surface 136 of the base member 122 to retain the two components together. Advantageously, the body 130 and the base member 122 may be clipped on during installation. As will be described in greater detail herein, the securement device 112 may include a support post 140 and a wall 180 extending from the body 130. The support post 140 and the wall 180 are operable to engage the case 120 (FIG. 1) of the power source 102 to restrict rotation of the busbar 106 and the fuse 104 relative to the case 120.

Figure 3A:
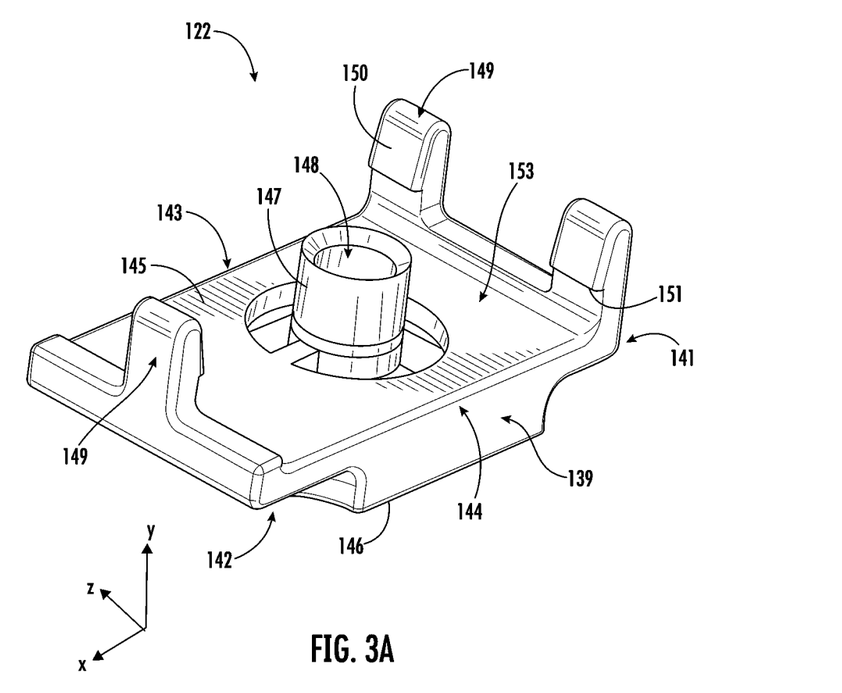
FIG. 3A depicts a first perspective view of a base member of the fuse assembly according to embodiments of the present disclosure.
Figure 3B:
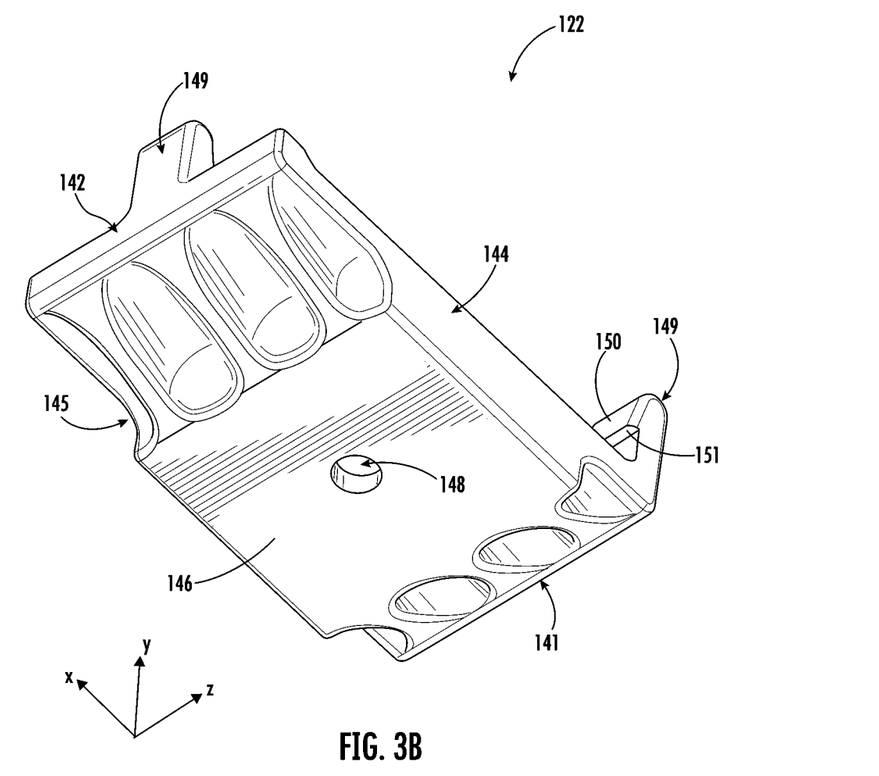
FIG. 3B depicts a second perspective view of a base member of the fuse assembly according to embodiments of the present disclosure.

Turning now to FIGS. 3A-3B, the base member 122 according to embodiments of the present disclosure will be described in greater detail. As shown, the base member 122 may include a base body 139 having a first end 141 opposite a second end 142, a first side 143 opposite a second side 144, and an interior surface 145 opposite an exterior surface 146. The interior surface 145 may be adjacent to, and/or in direct contact with, the busbar 106, while the exterior surface 146 may be adjacent to and/or in direct contact with the securement device 112. Although not limited to any particular shape or configuration, the features defining the exterior surface 146 may generally complement the surfaces or features defining the recess 128 of the body 130 of the securement device 112.

As further shown, the base member 122 may include a central cylinder 147 defining an opening 148 operable to receive the central support 124. In some embodiments, the base member 122 may further include a plurality of fasteners 149, such as press-fit or snap-fit tabs. As shown, each of the fasteners 149 may include a sloped engagement surface 150 extending to a retention surface 151. During assembly, the busbar 106 may be forced against each engagement surface 150, which causes the fasteners 149 to deflect away from the central cylinder 147. As the busbar 106 is depressed beyond each engagement surface 150, the fasteners 149 will relax and move towards the central cylinder 147 until a top surface of the busbar 106 is adjacent to, or in contact with, the retention surface 151. The retention surface 151 in abutment with the top surface of the busbar 106 maintains the busbar 106 within an internal area 153 of the base member 122.

Figure 4A:
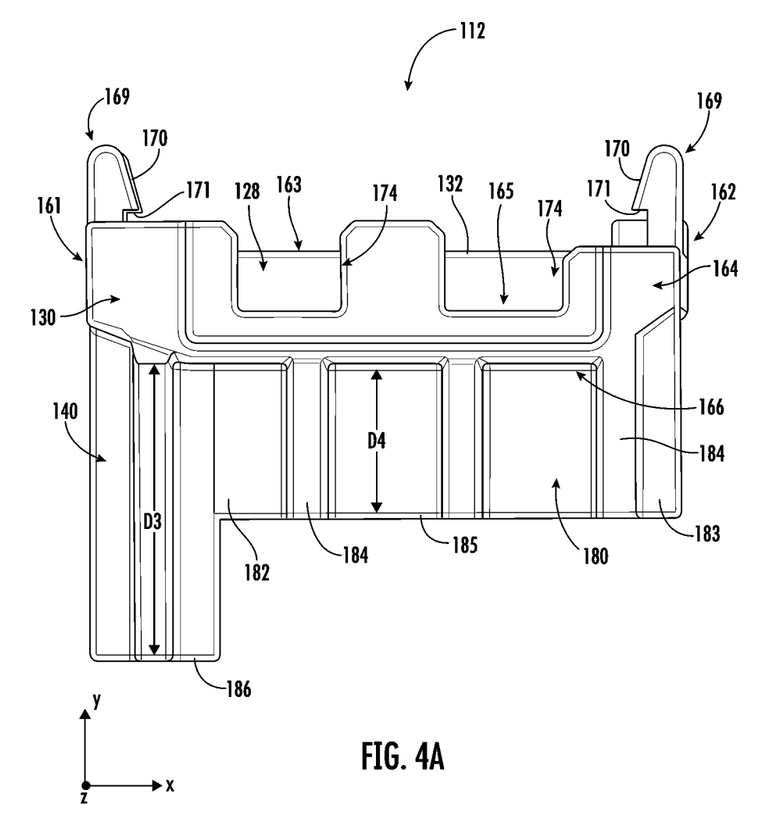
FIG. 4A depicts a side view of a securement device of the fuse assembly according to embodiments of the present disclosure.
Figure 4B:
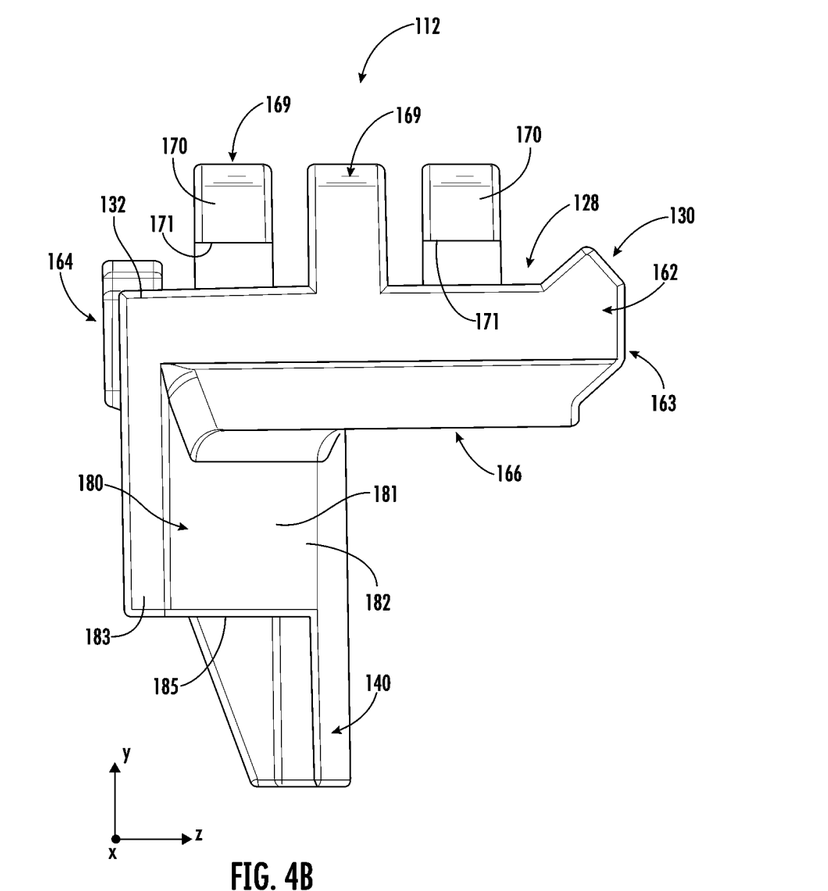
FIG. 4B depicts an end view of the securement device of the fuse assembly according to embodiments of the present disclosure.
Figure 4C:
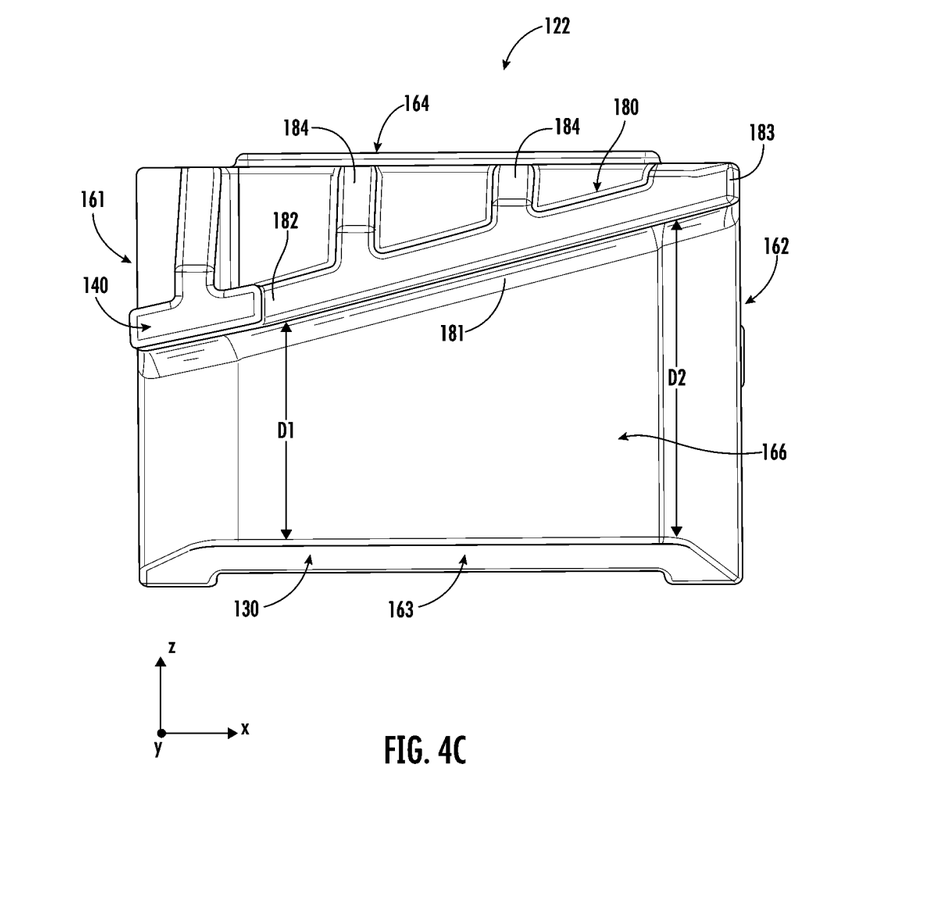
FIG. 4C depicts a bottom view of the securement device of the fuse assembly according to embodiments of the present disclosure.

Turning now to FIGS. 4A-4C, the securement device 112 according to embodiments of the present disclosure will be described in greater detail. As shown, the body 130 of the securement device 112 may include a first end 161 opposite a second end 162, a first side 163 opposite a second side 164, and first main surface 165 opposite a second main surface 166. The first main surface 165 may generally correspond to an upper side of the body 130, while the second main surface 166 may generally correspond to a lower or underside of the body 130. Although not limited to any particular material, the securement device 112 may be made from a non-conductive material.

In some embodiments, the securement device 112 includes the plurality of fasteners 169, such as press-fit or snap-fit tabs. As shown, each of the fasteners 169 may include a sloped engagement surface 170 extending to a retention surface 171. During assembly, the base member 122, which is secured to the fuse 104 and the busbar 106, may be forced against each engagement surface 170, which causes the fasteners 169 to deflect outwardly from the recess 128. As the base member 122 is depressed beyond each engagement surface 170, the fasteners 169 will relax and move back towards an original position until the top surface 136 of the base member 122 is adjacent to, or in contact with, the retention surface 171. The retention surface 171 in abutment with the top surface 136 of the base member 122 maintains the fuse 104 within the recess 128 of the base member 122.

In some embodiments, the fasteners 169 extend upwardly from the sidewall 132 of the body 130 (e.g., along the y-direction). As best shown in FIG. 4A, the sidewall 132 may further include one or more openings 174 operable to receive tabs 175 (FIGS. 2A-2B) of the busbar 106. Advantageously, the sidewall 132 may extend farther from the fuse 104 (e.g., along the z-direction) than the tabs 175 of the busbar 106 to protect the busbar 106 from inadvertently making contact with conductive components in close proximity thereto.

The securement device 112 may further include the wall 180 extending from the body 130. More specifically, the wall 180 may be coupled to, or integrally formed with, the second main surface 166. The wall 180 may generally extend perpendicular from a plane (e.g., x-z plane) defined by the second main surface 166. Although not limited to any particular shape or configuration, the wall 180 may include a main section 181 having a first wall end 182 opposite a second wall end 183. The main section 181 may include one or more support ribs 184 connected with the second main surface 166. In some embodiments, the support ribs 184 may extend to a free edge 185 of the main section 181. In some embodiments, the wall 180 may be integrally formed with the support post 140. In other embodiments, the wall 180 and the support post 140 are separated from one another by a gap.

As best demonstrated in FIG. 4C, the first wall end 182 may be offset (e.g., along the z-direction) relative to the second wall end 183 such that a first distance 'D1' between the first wall end 182 and the first side 163 of the body 130 is different (e.g., less) than a second distance 'D2' between the second wall end 183 and the first side 163 of the body 130. Additionally, a distance 'PD' between the support post 140 and the first side 163 of the body 130 may be less than D1 and D2. As a result, various battery tolerances can be accommodated by a same securement device 112.

Figure 5A:
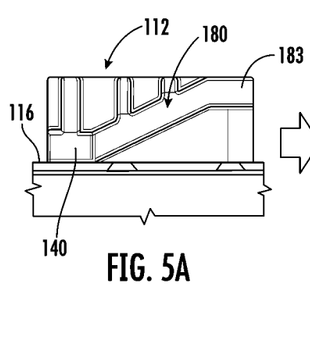
FIG. 5 depicts side views of the securement device according to embodiments of the present disclosure.
Figure 5B:
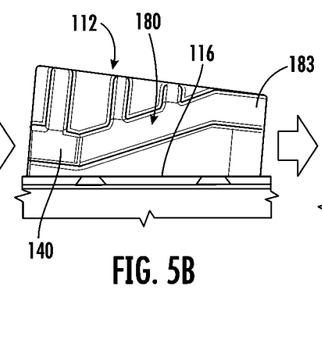
Figure 5C:
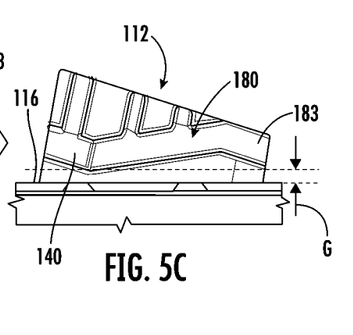

This is further demonstrated in FIG. 5, which shows the support post 140 in direct contact with the side surface 116 of the case 120 in position (a). As the securement device 112 rotates to position (b), the support post 140 disengages from the side surface 116, while the second wall end 183 begins to rotate/move towards the side surface 116. In position (c), a gap 'G' between the support post 140 and the side surface 116 may be approximately equal to the distance between the wall 180 and the side surface 116. The gap allows the securement device 112 to be mounted to batteries with various dimensions. The securement device 112 may then continue to rotate until second wall end 183 directly engages the side surface 116. The wall 180 restricts further movement of the fuse 104 and the busbar 106 during torqueing and/or vibration.

Referring again to FIG. 4A, a free end 186 of the support post 140 may extend down from the second main surface 166 by a third distance 'D3', while the free edge 185 of the wall 180 may extend down from the second main surface 166 by a fourth distance 'D4'. As shown, D3>D4. In other embodiments, D3 and D4 may be equal. Making the support post 140 longer than the wall 180 may ensure contact between the support post 140 and the case 120 of the power supply 102 should the fuse 104 and securement device 112 rotate slightly.

For the sake of convenience and clarity, terms such as "top," "bottom," "upper," "lower," "vertical," "horizontal," "lateral," and "longitudinal" are used herein to describe the relative placement and orientation of components and their constituent parts as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, one of skill will understand when an element or component is referred to as being formed on, deposited on, or disposed "on," "over" or "atop" another element, the element can be directly on the other element or intervening elements may also be present. In contrast, when an element is referred to as being "directly on," "directly over" or "directly atop" another element, no intervening elements are present.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A fuse assembly, comprising:
   a fusible device connected to a conductive component, wherein the conductive component is operable to connect to a terminal of a power source; and
   a securement device coupled to the fusible device, the securement device comprising:
      a body including a recess operable to receive the fusible device, the body comprising a first side opposite a second side, and a first end opposite a second end;
      a support post extending from the body, wherein the support post is located at the first end of the body, and wherein the support post is operable to engage the power source to reduce rotation of the securement device and the fusible device relative to the power source; and
      a wall extending from the body diagonally between the first end and the second end, wherein the wall extends between the support post and the second end of the body, wherein a first wall end and a second wall end of the wall are offset relative to one another such that a first distance between the first wall end and the first side of the body is different than a second distance between the second wall end and the first side of the body.

2. The fuse assembly of claim 1, further comprising a base member coupled to the conductive component and to the body of the securement device.

3. The fuse assembly of claim 2, further comprising a central support coupling together the fusible device, the conductive component, and the base member.

4. The fuse assembly of claim 2, wherein the body of the securement device further comprises:
   a sidewall extending along at least one of the first side or the second side, wherein the sidewall comprises an opening operable to receive a tab of the conductive component; and
   a plurality of fasteners extending from the sidewall, wherein the plurality of fasteners are coupled to the base member.

5. The fuse assembly of claim 4, wherein one or more of the plurality of fasteners is a press-fit tab comprising a sloped engagement surface and a retention surface, and wherein the retention surface is operable to engage an upper surface of the base member.

6. The fuse assembly of claim 1, wherein the wall is connected to the support post, wherein the wall extends perpendicular to a plane defined by a lower surface of the body of the securement device, wherein a first dimension of the first wall end and a second dimension of the second wall end are the same, and wherein the first and second dimensions are measured from the plane defined by the lower surface.

7. The fuse assembly of claim 1, wherein a free end of the support post extends below the body by a third distance, wherein a free edge of the wall extends below the body by a fourth distance, and wherein the third distance is greater than the fourth distance.

8. The fuse assembly of claim 1, wherein the conductive component is a busbar, wherein the power source is a battery comprising a battery case directly adjacent the support post, and wherein the busbar comprises an opening for receiving the terminal of the battery.

9. A securement device, comprising:
a body including a first end opposite a second end, a first side opposite a second side, and a first main side opposite a second main side, wherein the first main side is operable to receive a fusible device within a recess;
a support post located at the first end of the body;
a wall extending from the body diagonally between the first end and the second end, the wall extending from the second main side of the body, wherein the wall includes a first wall end and a second wall end, wherein the wall extends between the support post and the second end of the body, and wherein the first wall end and the second wall end are offset relative to one another such that a first distance between the first wall end and the first side of the body is different than a second distance between the second wall end and the first side of the body, wherein the support post is operable to engage a power source to reduce rotation of the body and the fusible device relative to the power source.

10. The securement device of claim 9, wherein the body of the securement device comprises:
a sidewall extending along at least one of the first side or the second side, wherein the sidewall comprises an opening operable to receive a tab of a busbar coupled to the fusible device; and
a plurality of fasteners extending from the sidewall.

11. The securement device of claim 10, wherein one or more of the plurality of fasteners is a press-fit tab comprising a sloped engagement surface and a retention surface, and wherein the retention surface is operable to engage an upper surface of a base member coupled to the fusible device.

12. The securement device of claim 9, wherein the wall is connected to the support post, and wherein the wall extends perpendicular to a plane defined by the second main side of the body.

13. The securement device of claim 9, wherein a free end of the support post extends below the body by a third distance, wherein a free edge of the wall extends below the body by a fourth distance, and wherein the third distance is greater than the fourth distance.

14. A fuse assembly, comprising:
a fusible device connected to a busbar and base member by a central support, wherein the busbar is operable to connect to a terminal of a battery; and
a securement device coupled to the fusible device, the securement device comprising:
a body including a recess operable to receive the fusible device, the body comprising a first side opposite a second side, and a first end opposite a second end;
a support post extending from the body, wherein the support post is located at the first end of the body, and wherein the support post is operable to engage a case of the battery to reduce rotation of the securement device and the fusible device relative to the battery; and
a wall extending from the body diagonally between the first end and the second end, wherein the wall extends between the support post and the second end of the body, wherein a first wall end and a second wall end of the wall are offset relative to one another such that a first distance between the first wall end and the first side of the body is different than a second distance between the second wall end and the first side of the body.

15. The fuse assembly of claim 14, wherein the body of the securement device comprises:
a sidewall extending along at least one of the first side or the second side, wherein
the sidewall comprises an opening operable to receive a tab of the busbar; and
a plurality of press-fit tabs extending from the sidewall, wherein the plurality of press-fit tabs are coupleable with the base member.

16. The fuse assembly of claim 14, wherein the wall is connected to the support post, and wherein the wall extends perpendicular to a plane defined by a lower surface of the body of the securement device.

17. The fuse assembly of claim 14, wherein a free end of the support post extends below the body by a third distance, wherein a free edge of the wall extends below the body by a fourth distance, and wherein the third distance is greater than the fourth distance.

* * * * *